R. V. SAGE.
DUMP CAR.
APPLICATION FILED OCT. 3, 1912.
1,087,184.
Patented Feb. 17, 1914.
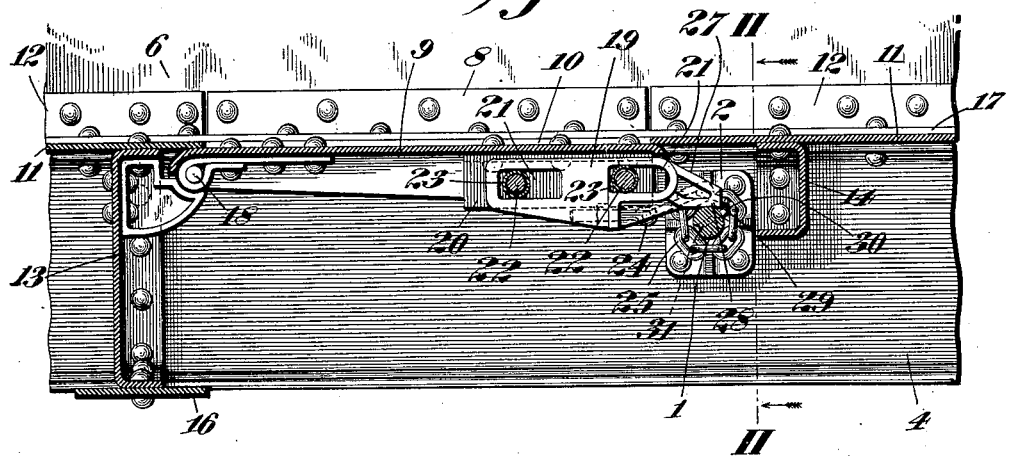
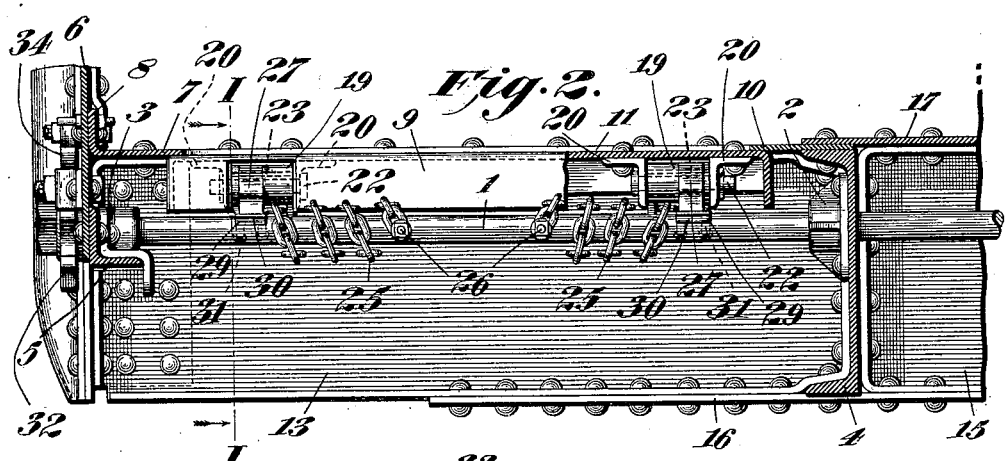
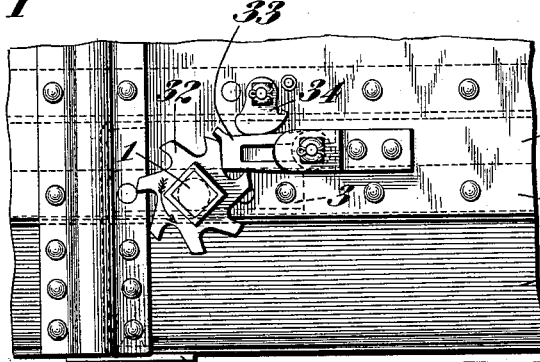
WITNESSES,
Elmer Leavey
Robert A. Beers
INVENTOR.
Ralph V. Sage
by Geo. E. Thackray
his ATTORNEY.
COLUMBIA PLANOGRAPH CO., WASHINGTON, D. C.

UNITED STATES PATENT OFFICE.

RALPH V. SAGE, OF WESTMONT, PENNSYLVANIA.

DUMP-CAR.

1,087,184.  Specification of Letters Patent.  Patented Feb. 17, 1914.

Application filed October 3, 1912. Serial No. 723,665.

*To all whom it may concern:*

Be it known that I, RALPH V. SAGE, a citizen of the United States, residing in the borough of Westmont, in the county of Cambria and State of Pennsylvania, have invented certain new and useful Improvements in Dump-Cars; and I do hereby declare the following to be a full, clear, and exact description of the invention, such as will enable others skilled in the art to which it appertains to make and use the same.

My invention relates to dump cars with special reference to means for operating and locking the drop-doors thereof, whether of the gondola or other type, and the object of the invention is to provide a quick and effective means for opening or closing a hinged door or a series of doors by employing an operating-shaft, flexible connections or chains winding or unwinding thereon, and means for securing the individual doors in their closed positions independently of each other of the chains or lifting means.

With this object in view my invention consists in providing a locking mechanism in connection with a chain, or other flexible member, one end of which is attached to the locking mechanism, while the opposite end is secured to the operating-shaft. This locking mechanism comprises a latch-bar slidably attached to the drop-door between angular brackets, which brackets have their vertical legs connected together by bolts or pins which pass through slots in the latch-bar, said bolts having tubular rollers mounted thereon between the vertical legs of the angular brackets, thereby reducing the friction on the latch-bar when it slides backward or forward in opening or closing the drop-door. In closing the door a wrench or crank is applied to the square hub of a ratchet-wheel which is attached to the outer end of the operating-shaft, and the chain or flexible connection is wound upon the operating-shaft until the forward end of the latch-bar rests on the operating-shaft in which position the door will be closed and locked. In opening the door the operating-shaft is rotated in the opposite direction, thereby unwinding the chain therefrom, and to insure the release of the latch-bar a projection is formed or mounted on the operating-shaft which contacts with the forward end of the latch-bar to positively push the same out of engagement with its support. This projection comprises a staple-member of approximately U-shape, the central portion of which projects beyond the surface of the operating-shaft, while the legs of the staple pass through holes in the operating-shaft, the ends being clenched on the opposite side thereof by being expanded into the countersunk outer edges of the holes, and this manner of attaching and forming a lug on the operating-shaft is another object of my invention.

Further objects of my invention relate to the slotted construction of the latch-bar in which are located the roller bearings for supporting the latch-bar and the manner of attaching it to the drop-door, the ends of the slots acting as stops to limit the forward and backward movement of the latch-bar and to allow the forward end of the latch-bar to rest directly on the operating-shaft, when the door is closed.

In illustrating my invention I have shown the operating-shaft extending transversely of the car for operating a pair of drop-doors, although only one door is illustrated, the other side of the car being broken away, but it will be understood that the operation of the door is substantially the same on the opposite side of the car. I also wish it understood that the operating-shaft may extend longitudinally of the car, under or adjoining the lower outer edge thereof, and thereby be adapted to dump a plurality of doors arranged longitudinally of said car, with their hinges on or near the center sill.

Other objects of my invention will be described and referred to hereinafter.

Having thus given this general description of my invention, I will now, in order to make the same more clear, refer to the accompanying one sheet of drawings forming part of this specification and in which similar characters of reference designate like parts.

Figure 1 is a vertical longitudinal section taken on the line I—I of Fig. 2, showing a portion of a gondola car with the door closed and my operating and locking mechanisms in the position they will assume under these conditions. Fig. 2 is a vertical transverse section taken on the line II—II of Fig. 1, with parts broken away to more clearly show the manner of attaching my latch-bars to the door. Fig. 3 is an elevation in detail of a part of the side of a car showing the ratchet, pawl and detent mechanism for further holding the parts in a locked position. Fig. 4 is a detail of the staple lug showing the manner of attaching it to the operating-shaft.

Referring to the drawings in detail, the operating shaft 1 extends transversely of the car body and is mounted in suitable bearings 2 and 3 attached to the center sills 4 and the lower chord members 5 of the plate girder side 6 of the car.

The floor of the car is built up of a plurality of plates comprising a narrow floor plate 7 having an integral upturned flange 8 attached to the plate girder side 6 of the car at a point between the drop-door 9 and the side of the car. An intermediate floor strip 10 is secured to the top flange of the center-sills 4 opposite the narrow flanged floor plate 7 and extends outwardly therefrom a short distance. Floor plates 11 extend between the drop doors, each of which has at its outer edge an integral upturned flange 12 which is riveted to the car side, while the inner end of each is laid over and secured to the top flange of the center-sills. Between the center-sills 4 and the sides of the car the plates 11 are supported and riveted to the main cross bearers 13 or to the intermediate cross bearers 14, each of which is preferably made of pressed metal with a vertical web and integral flanges extending at right angles thereto entirely around the edges thereof, their inner and outer flanges being attached to the center-sills and sides of the car respectively.

Between the center-sills 4 (one of which is not shown), and in longitudinal alinement with the main cross bearers 13 is a shallow pressed metal box-shaped spacing member 15 having a vertical web and integral flanges around its outer edge. The vertical side flanges of these spacing members are attached to the center-sills 4 and the inner flanges of the main cross bearers 13 by rivets which pass through the center-sills, while the bottom horizontal flanges of the main cross bearers 13, the center-sills 4 and the spacing member 15 are attached together on their lower faces by a tie plate 16 riveted thereto. A cover plate 17 is laid over the edges of the floor strip 10 and the inner edges of the floor plates 11 and is riveted to the center-sills 4 together with the said floor plates and also to the top horizontal flange of the spacing member 15 as shown.

The drop-door 9, shown as formed of pressed metal with integral flanged edges, is hinged to the main cross bearer 13 as at 18, and when closed, its top surface is flush with, and closes against, the lower extending faces of the floor plates 7, 10 and 11, as clearly shown in Figs. 1 and 2 of the drawings.

One or more latch-bars 19 are slidably attached between guideways to the forward edge of each door, the flanged edge of the door being cut at this point to allow the latch-bars to extend beyond the door. As illustrated in the drawings, two latch-bars are shown of similar construction, but rights and lefts, to allow for a right and left winding of the flexible connections, although they may be otherwise, if desired.

The latch-bar guideways are constructed of a pair of angles 20 with their vertical flanges placed back to back, but spaced apart from each other, their horizontal flanges extending outwardly therefrom and riveted to the body of the drop-door.

The latch-bars 19 are provided with slots as shown at 21, mounted on the bolts 22 and the tubular rollers 23 carried thereby, and arranged between the guideways 20. The ends of the bolts 22 are mounted in holes provided therefor in the vertical flanges of the guideways 20, and secured thereon by heads and cotter pins as shown, for preventing longitudinal movement thereof. An eye-bolt 24 is attached to the lower flange at one side of each latch-bar, to the eye of which is fastened one end of a chain 25 or other flexible connection, the opposite end of which is secured to the operating-shaft 1 as shown at 26, and is wound or unwound upon the operating-shaft 1, but out of alinement with the forward projecting catch of the latch bar as the door is closed or opened.

The forward upper projecting face of each latch-bar 19 is beveled as shown at 27 to enable it to be automatically pushed back, so that it may pass the operating-shaft 1 when the door is being closed. The underside of the forwardly projecting portion of the latch-bar 19 has a flat bearing surface as shown at 28 which rests directly on the operating-shaft, when the door is closed.

In order to positively push the latch-bar when it is desired to open the door 9, I attach to the operating-shaft 1 a staple member 29 of substantially U-shaped form, the central portion of which as shown at 30 is square in cross section and projects beyond the surface of the operating-shaft, thereby adapting it to contact with the outer end of the latch-bar 19. The legs of the staple member 29 are inserted into holes 31 in the operating-shaft 1, and their ends are clenched therein by expanding them into the countersunk outer edges of the holes 31 as clearly shown in Fig. 4 of the drawings. The ends of the operating-shafts extend beyond the outside of the car and have squared end portions to which are attached ratchets 32, each provided with a square hub upon which may be applied a wrench or crank (not shown) when it is desired to open or close the doors.

33 is a pawl adapted to engage with the teeth of the ratchet, while 34 is a detent for locking the pawl 33 in engagement with the ratchet 32.

The operation of my device is as follows:—Assuming that the mechanism is in the position shown in the drawings with the doors closed, and it is desired to open them:—A wrench is applied to the squared hub of the ratchet 32, which is rigidly attached to the outer end of the operating-shaft 1, the detent 34 is then swung out of engagement with the pawl 33 which is then raised out of contact with the teeth of the ratchet 32; the operating-shaft 1 may then be rotated in the direction of the arrow shown in Fig. 3 of the drawings. As the operating-shaft is rotated, the central square portion 30 of the staple member 29 comes in contact with the forward projecting edge of the latch-bar 19, thereby positively forcing it out of engagement with the operating-shaft, and as the operating-shaft continues to rotate, the chain 25 or other flexible connection will be unwound from the operating shaft 1 and the door will swing downward by gravity to its open position. The roller bearings 23 for the latch-bars 19 greatly reduce the friction in operation and the ends of the slots 21 act as stops to limit the forward or backward movement of the latch-bars. In closing the door the wrench is applied to the square hub of the ratchet 32 and the operating-shaft rotated in the reverse direction, the chain 25 or other flexible connection is thereby wound upon the operating-shaft 1 until the beveled upper forward face 27 of the latch-bar 19 comes in contact with the operating-shaft 1 when the said latch-bar 19 will be automatically pushed backward, and as the shaft continues to rotate, the latch-bar will be pulled over the top of the operating-shaft 1 and its flat forward bearing surface 28 will be seated directly upon the operating-shaft 1. The pawl 33 and detent 34 can then be returned to their locked positions, as shown on the drawings.

Although I have shown and described my invention in considerable detail, I do not wish to be limited to the exact construction specified, but may use such substitutions, modifications or equivalents thereof, as are embraced within the scope of my invention, or as pointed out in the claims.

Having thus described my invention, what I claim and desire to secure by Letters Patent is:—

1. In a car door mechanism, a swinging door hinged to the car framing, a rotatable operating-shaft, a latch-bar arranged to operate on rollers mounted on the door aforesaid, said latch-bar being adapted to rest directly on the operating-shaft when the door is in its closed position.

2. In a car door mechanism, a rotatable operating-shaft, a latch-bar slidably mounted on roller bearings attached to the car door, and adapted to bear directly on the operating-shaft when the door is in its closed position, a flexible winding connection between the operating-shaft and the latch-bar, and a projection secured to the operating-shaft adapted to release the latch-bar therefrom by the opening rotation of the said shaft.

3. In a car door mechanism, a rotatable operating-shaft, a latch-bar mounted on roller bearings arranged between and supported by angular guideways attached to the car door, said latch-bar being adapted to bear directly on the operating-shaft when the door is in its closed position, a flexible connection between said operating shaft and the latch-bar, and a projection secured to the operating-shaft adapted to push the latch-bar by the opening rotation of said shaft.

4. In a dump car, the combination with a hinged drop-door, of a latch-bar adapted to reciprocate between angular guideways mounted thereon, tubular rollers mounted in and between said guideways and adapted to slidably support said latch-bar, the outwardly projecting portion of said latch-bar being adapted to bear directly on the operating-shaft when the door is in its closed position, a flexible connection between the latch-bar and the operating-shaft, and a projection secured to the operating-shaft adapted to contact with the forward end of the latch-bar to positively release it during the opening rotation of said shaft.

5. In a dump car, a swinging door, a rotatable winding shaft, a pair of angle guides secured to said door, a pair of roller bearings mounted between said guides, a slotted latch-bar mounted on said roller bearings and between said guides, a flexible winding connection between said shaft and the end of the latch-bar, a projection on said shaft adapted to contact directly with and push said latch-bar when the shaft is rotated in its opening direction.

6. In a dump car, a hinged door, a guideway on said door, a pair of tubular rollers rotatably mounted within said guideway, a latch-bar provided with longitudinally extending slots therein, whereby it is reciprocably mounted on the rollers aforesaid and adapted to rest directly on the shaft when the door is closed, a rotatable shaft mounted on the car framing, and a flexible connection from said shaft to said latch-bar.

7. In a dump car, a hinged door, a guideway on said door, a pair of tubular rollers rotatably mounted within said guideway, a latch-bar provided with longitudinally extending slots therein, whereby it is reciprocably mounted on the rollers aforesaid, a rotatable shaft mounted on the car framing, a flexible connection from said shaft to said latch-bar, adapted to draw the end of said latch-bar over and directly upon said shaft by the winding rotation thereof, and a projection mounted on said shaft adapted to contact with and release said latch-bar by the reverse rotation of said shaft.

8. The combination with a hinged car door of a pair of tubular rollers rotatably mounted on pins secured therein, a latch-bar provided with longitudinal slots whereby it is mounted on said rollers and adapted to limitably reciprocate thereon, a rotatable shaft mounted on the car-framing adapted to directly support said latch when the door is closed and means attached to said latch-bar and shaft for operating the same and said door.

9. In a car door mechanism, an operating-shaft, a U-shaped staple-member provided with a connecting portion of rectangular section, the projecting legs of which are secured within openings provided therein, the rectangular portion of which member projects beyond the surface of the operating-shaft, thereby forming a contact lug.

10. In a car door mechanism, an operating-shaft, a U-shaped staple-member attached thereto by its leg portions, the intermediate portion of which member has a flat surface which projects beyond the exterior of the operating-shaft, thereby forming a contact lug.

11. In a car door mechanism, an operating-shaft, a U-shaped member attached thereto, the intermediate portion of which is rectangular in cross section and projects beyond the surface of the operating-shaft, thereby forming a contact lug, the legs of said staple-member being secured in holes provided therefor in said shaft.

12. In a car door mechanism, an operating-shaft, a U-shaped staple-member attached thereto, the intermediate portion of which is square in cross section and projects beyond the surface of the operating-shaft to form a contact lug, the legs of the staple-member being cylindrical and extending through holes in the operating-shaft to the opposite side thereof, the extremities of said staple legs being expanded into the countersunk edges of the holes.

13. In a car door mechanism, an operating-shaft mounted on the car body, a flexible connection therefrom to a latch-bar mounted on roller bearings secured to the door and adapted to rest directly on the operating-shaft when the door is closed by the winding rotating of said shaft, and a staple-member attached to the operating-shaft adapted to contact with and push the latch-bar to its open position by the reverse rotation of said shaft.

14. A car door latch mechanism comprising a guideway secured to the car door, a pair of tubular rollers mounted within said guideway, a latch-bar provided with longitudinal slots, whereby it is reciprocably mounted on said rollers and adapted to rest directly on the shaft when the door is closed, and means attached to said latch-bar for operating the same and said door.

15. A car door mechanism comprising a pair of rollers rotatably mounted on the door, a latch-bar provided with longitudinal slots whereby it is mounted on said rollers, a beveled striking face on the outwardly projecting end of said latch-bar adapted to retract the same by the swinging movement thereof, a rotatable shaft mounted on the car framing adapted to contact with and to support the latch aforesaid, and a flexible connection from said shaft to said latch.

16. A car door mechanism comprising a rotatable shaft mounted on the car framing, a hinged door with a pair of rollers mounted thereon, a latch-bar provided with longitudinal slots, whereby it is reciprocably mounted on said rollers, a beveled striking face on the outwardly projecting end of the said latch-bar adapted to retract the same by contact with the shaft aforesaid, a supporting surface on said projecting end adapted to contact with and support the same on said shaft, a flexible connection from said shaft to said latch-bar, and a projection on said shaft adapted to contact with and open said latch by the unwinding rotation thereof.

In testimony whereof I hereto affix my signature in the presence of two witnesses.

RALPH V. SAGE.

Witnesses:
 ROBERT A. BEERS,
 EDITH DAWSON.

---

Copies of this patent may be obtained for five cents each, by addressing the "Commissioner of Patents, Washington, D. C."